US008967647B1

(12) United States Patent
Bastien

(10) Patent No.: US 8,967,647 B1
(45) Date of Patent: Mar. 3, 2015

(54) SUSPENSION SYSTEM FOR CHILD STROLLER

(71) Applicant: Monahan Products, LLC, Hingham, MA (US)

(72) Inventor: Richard M. Bastien, Cumberland, RI (US)

(73) Assignee: Monahan Products, LLC, Hingham, MA (US)

( * ) Notice: Subject to any disclaimer, the term of this patent is extended or adjusted under 35 U.S.C. 154(b) by 0 days.

(21) Appl. No.: 14/024,768

(22) Filed: Sep. 12, 2013

(51) Int. Cl.
*B62B 9/18* (2006.01)

(52) U.S. Cl.
CPC ........................................ *B62B 9/18* (2013.01)
USPC ....................................... 280/124.127; 16/44

(58) Field of Classification Search
USPC .................. 280/124.127, 647, 650, 642, 658, 280/87.051; 16/44
See application file for complete search history.

(56) References Cited

U.S. PATENT DOCUMENTS

| 4,078,817 | A | * | 3/1978 | Ferguson et al. | .......... 280/250.1 |
| 4,491,335 | A | * | 1/1985 | Evron | .......... 280/47.41 |
| 4,847,945 | A | * | 7/1989 | Schwartz et al. | ................. 16/30 |
| 5,103,530 | A | * | 4/1992 | Andrisin et al. | ................... 16/20 |
| 6,203,054 | B1 | * | 3/2001 | Matsumoto | ................... 280/647 |
| 6,543,798 | B2 | * | 4/2003 | Schaffner et al. | .......... 280/250.1 |
| 7,614,641 | B2 | * | 11/2009 | Hartenstine et al. | .......... 280/642 |
| 7,614,642 | B2 | * | 11/2009 | Dotsey et al. | ................. 280/649 |
| 7,775,547 | B2 | * | 8/2010 | Dotsey et al. | ................. 280/647 |
| 8,733,784 | B2 | * | 5/2014 | Kobayashi | ..................... 280/647 |
| 8,752,243 | B2 | * | 6/2014 | Guo et al. | ...................... 16/35 R |
| 2005/0006863 | A1 | * | 1/2005 | Ageneau | ..................... 280/47.38 |
| 2006/0214397 | A1 | * | 9/2006 | Dotsey et al. | ................. 280/647 |
| 2012/0242050 | A1 | * | 9/2012 | Schroeder et al. | .............. 280/29 |

FOREIGN PATENT DOCUMENTS

JP        2003063411 A  *  3/2003  ............... B62B 9/18

* cited by examiner

*Primary Examiner* — Drew Brown
(74) *Attorney, Agent, or Firm* — Lando & Anastasi, LLP

(57) ABSTRACT

Disclosed herein are aspects and embodiments of a suspension system for a stroller. In one example, a stroller includes a frame member and a suspension block coupled to the frame member. The suspension block includes a body and a suspension mechanism coupled to the body and disposed at an acute angle from a vertical axis of the body. The stroller further includes a wheel mounted on an axle coupled to the suspension block.

15 Claims, 4 Drawing Sheets

SUSPENSION SYSTEM FOR CHILD STROLLER

BACKGROUND

1. Field of Technology

Aspects and embodiments disclosed herein relate generally to child conveyance devices such as strollers and carriages, and more specifically, to suspension systems for same.

2. Discussion of Related Art

Young children are often conveyed by caregivers or parents in various types of baby carriages or strollers, referred to herein collectively as "strollers." Many strollers are not provided with any form of suspension system. In such strollers, when a wheel of the stroller is pushed over an obstacle, for example, a rock, stick, or curb, an impact force may be conveyed from the wheel and through the frame of the stroller to a child in the stroller. Such an impact force may be uncomfortable and in some instances dangerous to the child.

SUMMARY

In accordance with an aspect of the present disclosure, there is provided a stroller. The stroller comprises a frame member and a suspension block coupled to the frame member. The suspension block includes a body and a suspension mechanism coupled to the body and disposed at an acute angle from a vertical axis of the body. The stroller further includes a wheel mounted on an axle, the axle supported by the suspension block.

In some embodiments, the suspension mechanism includes an aperture defined by sidewalls extending from sides of the suspension block, the axle passing through the aperture.

In some embodiments, the aperture is disposed at an angle of about 30° from the vertical axis of the body when the axle is in a home position.

In some embodiments, the suspension mechanism includes a spring retainer supported by the suspension mechanism.

In some embodiments, the axle passes through an axle aperture defined in the spring retainer.

In some embodiments, the spring retainer is at least partially disposed within a spring retention chamber defined in the body of the suspension block.

In some embodiments, the spring retainer is biased away from an upper wall of the spring retention chamber.

In some embodiments, the spring retainer is biased away from the upper wall of the spring retention chamber by spring having a lower end coupled to the spring retainer and an upper end disposed against the upper wall of the spring retention chamber.

In some embodiments, at least a portion of the spring retainer is retained within the spring retention chamber by the axle.

In some embodiments, the suspension mechanism is configured and capable of absorbing an impact force applied to the wheel in a horizontal direction, an impact force applied to the wheel in a vertical direction, or an impact force applied to the wheel with components in both the horizontal direction and the vertical direction.

In accordance with another aspect, there is provided a suspension block for a stroller. The suspension block includes a body and a spring retention chamber defined in the body and having an axis disposed at an acute angle relative to a vertical axis of the body.

In some embodiments, the suspension block further comprises a suspension mechanism coupled to the body and including a biasing member configured to receive an axle of a wheel of the stroller.

In some embodiments, the suspension block further comprises an aperture passing through the body and disposed at a non-zero acute angle from a vertical axis of the body.

In some embodiments, the aperture forms an opening along an elongate axis of the spring retention chamber.

In some embodiments, the aperture is defined by sidewalls extending from sides of the suspension block.

In some embodiments, the biasing member comprises a spring retainer.

In some embodiments, the suspension block further comprises a spring disposed between the spring retainer and an upper wall of the spring retention chamber.

In some embodiments, an end of the spring fits around an upper reduced diameter portion of the spring retainer and rests against an upper shoulder portion of the spring retainer.

In some embodiments, the spring exerts a force on the spring retainer biasing the spring retainer out of the spring retention chamber.

In some embodiments, the spring retainer contacts a portion of an internal wall of the spring retention chamber.

BRIEF DESCRIPTION OF DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings.

DETAILED DESCRIPTION

Figure 1:
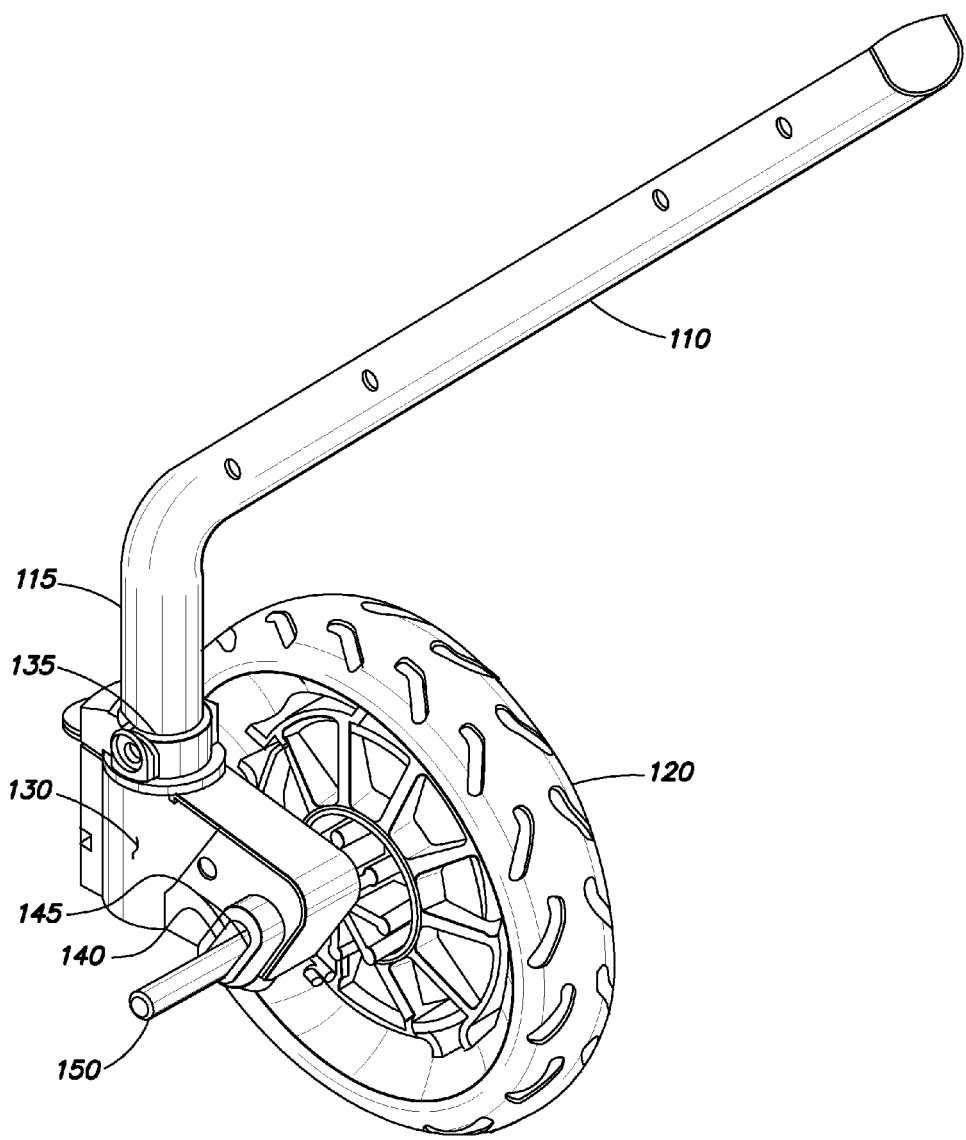
FIG. 1 is an isometric view of a wheel of a stroller coupled to a frame member of a stroller through an embodiment of a suspension block.

Aspects and embodiments disclosed herein are not limited to the details of construction and the arrangement of components set forth in the following description or illustrated in the drawings. Aspects and embodiments disclosed herein are capable of being practiced or of being carried out in various ways. The phraseology and terminology used herein is for the purpose of description and should not be regarded as limiting. The use of "including," "comprising," "having," "containing," "involving," and variations thereof herein is meant to encompass the items listed thereafter and equivalents thereof as well as additional items.

Some stroller designs include suspension systems which may facilitate the absorption of at least a portion of a vertical impact force which might be experienced by, for example, passing one or more wheels of a stroller over an obstacle such as a rock, stick, curb, or step. Such stroller designs, however, do not provide for absorption of horizontal impact forces, for example, impact forces which might be experienced when a stroller is inadvertently pushed against a door, wall, or other obstacle. A child present in such strollers may be at least partially protected from vertical impact forces, but not from horizontal impact forces.

As used herein the directional term "horizontal" refers to a direction of travel of a stroller when moving normally on wheels of the stroller. The directional term "vertical" refers to a direction approximately perpendicular to the direction of travel of a stroller when moving on the wheels of stroller.

Aspects and embodiments disclosed herein are generally directed to a suspension system for a stroller which provides protection against both vertical and horizontal impact forces to a child present in the stroller. In some embodiments the suspension system includes a plurality of impact absorbing mechanisms, one of which may be applied to each wheel of a stroller. In some embodiments, an impact absorbing mechanism is applied to only front wheels of a stroller, while in other embodiments, impact absorbing mechanisms may be applied only to rear wheels of a stroller, and in other embodiments to all wheels of a stroller.

Aspects and embodiments of the disclosed suspension system may provide for an axle of a wheel of a stroller to move both horizontally and vertically relative to a frame of the stroller upon application of an impact force to the wheel of the stroller. Upon application of a horizontal and/or vertical impact force to a wheel of the stroller, the wheel and axle may be reversibly displaced in both a horizontal and vertical direction relative to the frame of the stroller. A dampening mechanism in a suspension system applied to a wheel of the stroller may absorb the vertical and/or horizontal impact force, reducing the transfer of the impact force through the frame of the stroller to a child present in the stroller. A resilient element in a suspension system applied to an axle and wheel of the stroller may bias the axle and wheel into a resting or home position from which the axle and wheel may be displaced upon application of an impact force. The resilient element may displace the axle and wheel back to the resting or home position after the impact force has been absorbed or dissipated.

An isometric view of an embodiment of the disclosed suspension system mounted to a wheel and frame assembly of a stroller system is illustrated in FIG. 1. In FIG. 1, only a single wheel of a stroller and a single frame member is illustrated. It should be appreciated that similar structures as illustrated in FIG. 1 may be applied, with or without modification, to other wheel assemblies of a stroller system. In FIG. 1, a frame member 110 (only a lower portion of which is illustrated) is coupled to a wheel 120 of a stroller. Coupling between the frame member 110 and the wheel 120 is made through a suspension block 130. The suspension block 130 includes a suspension block aperture 135 which fits around a lower end 115 of the frame member 110 or which is otherwise secured to the lower end 115 of the frame member 110. In some embodiments, both the suspension block aperture 135 and the lower end 115 of the frame member 110 are cylindrical in cross section and the suspension block 130 may rotate about a vertical axis of the lower end 115 of the frame member 110 to allow for the wheel 120 to turn relative to the frame member 110. In some embodiments, the suspension block 130 may rotate only about the vertical axis of the lower end 115 of the frame member 110. In some embodiments, however, the suspension block 130 is secured to the frame member 110 and does not rotate about the lower end 115 of the frame member 110.

The suspension block 130 includes a diagonal aperture 140 through which an axle 150 of the wheel passes. The diagonal aperture 140 may be defined by sidewalls 145 extending from sides of the suspension block 130. The diagonal aperture 140 may be disposed at a non-zero angle from a vertical axis of the stroller and from a horizontal axis of the stroller. The diagonal aperture 140 may be disposed at an acute angle of about 30° from a vertical axis of the stroller or about 45° from horizontal and vertical axes of the stroller when the axle 150 is in the home position, although in other embodiments, the diagonal aperture 140 may be disposed at other angles. Embodiments disclosed herein are not limited to including a diagonal aperture 140 having a shape and/or orientation as illustrated in FIG. 1.

In some embodiments the axle may extend across the stroller to a second wheel and form a common axle for both the wheel 120 and the second wheel. In such embodiments a single suspension block 130 may provide impact protection for both the wheel 120 and the second wheel. In other embodiments, each wheel of the stroller is mounted on a separate axle 150 and each wheel may be provided with an associated suspension block 130.

Figure 2:
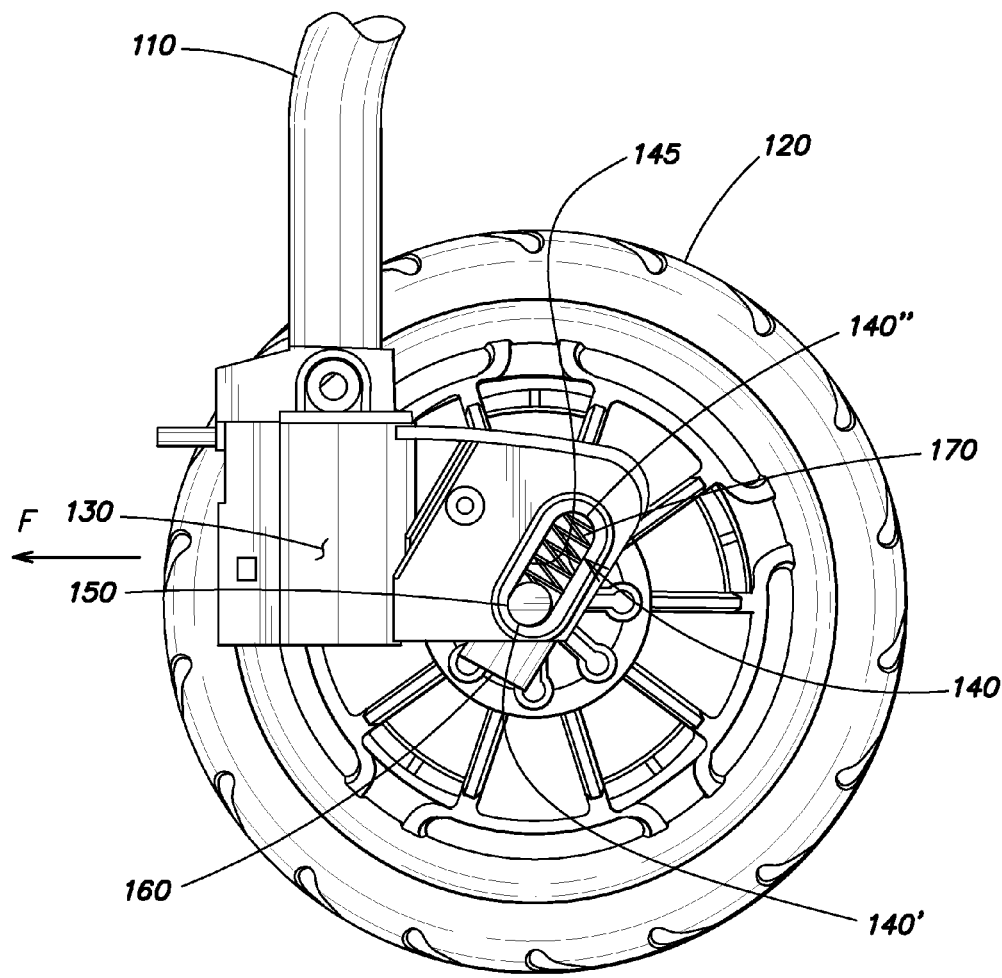
FIG. 2 is an elevational view of the wheel and suspension block of FIG. 1.
Figure 3:
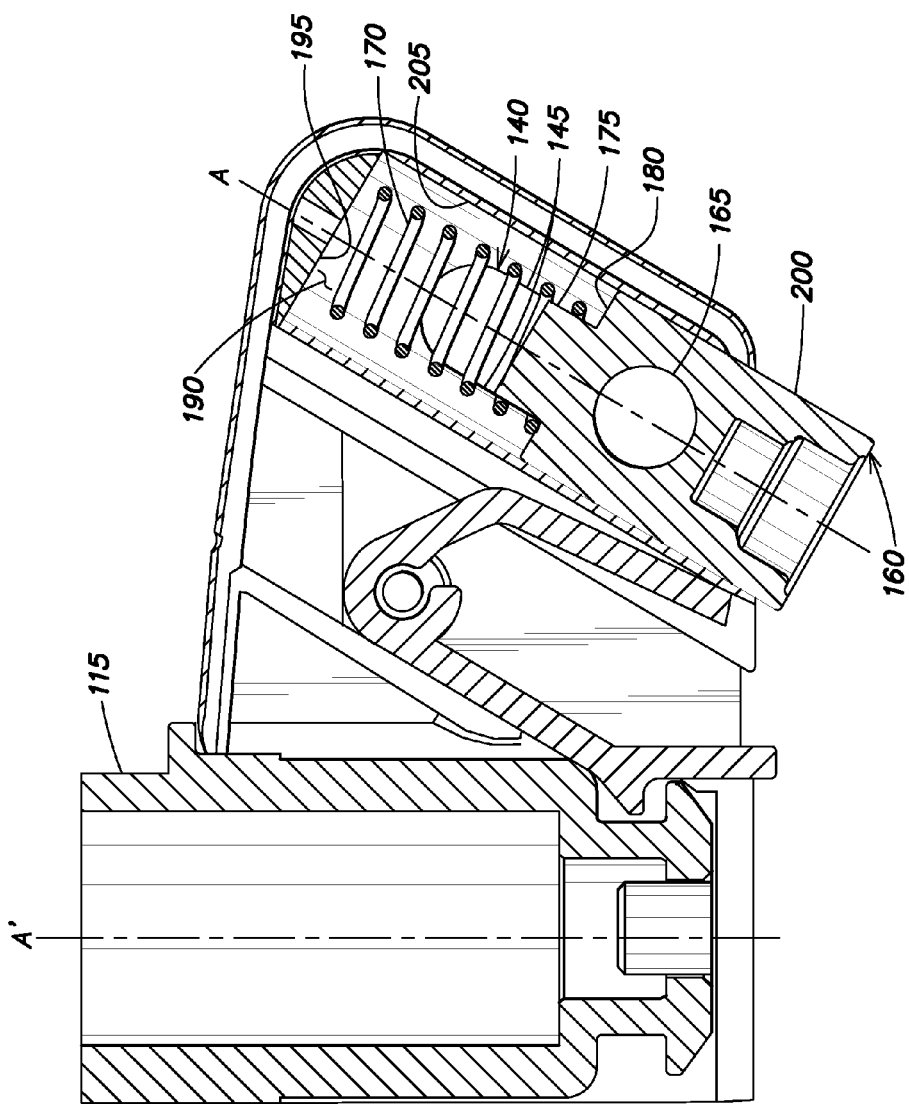
FIG. 3 is a cross sectional view of the suspension block of FIG. 1.

As shown in FIG. 2 and FIG. 3, the axle 150 is supported by a suspension mechanism disposed within the suspension block 130. The axle 150 passes through an axle aperture 165 defined in a spring retainer 160 disposed within the body of the suspension block 130. A spring 170 biases the spring retainer 160 out of the body of the suspension bock 130 and biases the axle 150 toward a lower forward end 140' of the diagonal aperture 140. When disposed against the side wall 145 of the diagonal aperture 140 at the lower forward end 140' of the diagonal aperture 140, the axle 150 is considered to be in the resting or home position. A forward horizontal direction of travel of the wheel 120 is indicated by the arrow F in FIG. 2.

In FIG. 3, which is a cross sectional view of a portion of the suspension block 130, it can be seen that a lower end of the spring 170 engages with and couples to the spring retainer 160. The lower end of the spring 170 may couple to the spring retainer 160 by fitting around an upper reduced diameter portion 175 of the spring retainer 160. The lower end of the spring 170 may rest against an upper shoulder portion 180 of the spring retainer 160. Other methods of coupling the spring 170 to the spring retainer 160 will be recognized by one of ordinary skill in the art and embodiments disclosed herein are not limited to including the illustrated mechanism for coupling the spring 170 to the spring retainer 160 unless explicitly set forth in the claims.

The spring retainer 160 and spring 170 are disposed within a spring retention chamber 190 defined in the body of the suspension block 130. The spring retention chamber 190 may include an elongate chamber having an axis A along its elongate dimension which is disposed at a non-zero angle relative to a vertical axis A' of the suspension block aperture 135 and to an axis normal to the vertical axis A' of the suspension block aperture 135, for example, at an acute angle of about 30° or about 45° relative to the vertical axis A' of the suspension block aperture 135. An upper end of the spring 170 opposite from the lower end of the spring 170 which engages and couples to the spring retainer 160 is disposed against an upper internal wall 195 of the spring retention chamber 190.

The vertical axis of the body of the suspension block and the vertical axis of the lower end 115 of the frame member 110 may be considered parallel to the vertical axis A' of the suspension block aperture 135.

Figure 4:
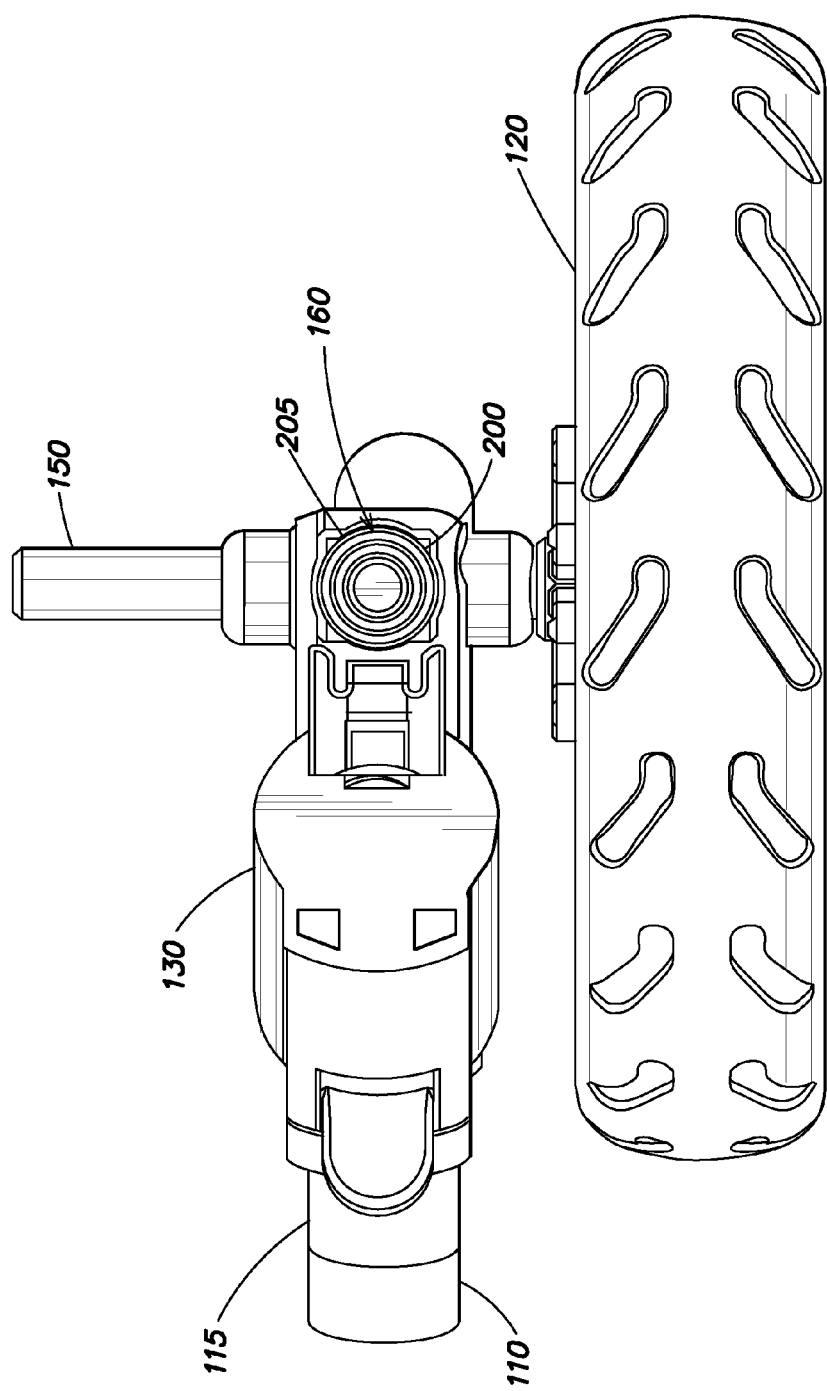
FIG. 4 is a plan view from beneath of the wheel and suspension block of FIG. 1.

An outer surface 200 of the spring retainer 160 and at least a portion of an inner wall 205 of the spring retention chamber may have substantially similar cross sections, for example, as illustrated in FIG. 4, substantially circular cross sections. A small clearance is provided between the outer surface 200 of the spring retainer 160 and the portion of the inner wall 205 of the spring retention chamber 190 so that the spring retainer 160 may reciprocate up and down through the spring retention chamber 190, i.e., towards and away from the upper internal wall 195 of the spring retention chamber 190.

In some embodiments, the outer surface 200 of the spring retainer 160 and the inner wall 205 of the spring retention chamber 190 may have different cross sections than illustrated. For example, the outer surface 200 of the spring retainer 160 and the inner wall 205 of the spring retention chamber 190 may have cross sections which are rectangular, oval, or having the shape of any other regular or irregular polygon. In some embodiments, the outer surface 200 of the spring retainer 160 may contact the inner wall 205 of the spring retention chamber 190 about a substantial amount or an entirety of its periphery. In other embodiments, such as illustrated in FIG. 4, the inner wall 205 of the spring retention chamber 190 may have portions which contact the outer surface 200 of the spring retainer 160 and other portions which do not.

The portions of the inner wall 205 of the spring retention chamber 190 which contact the outer surface 200 of the spring retainer 160 may function as linear bearings which position the spring retainer 160 within the retention chamber 190 and guide movement of the spring retainer 160 within the retention chamber 190. The portions of the inner wall 205 of the spring retention chamber 190 which contact the outer surface 200 of the spring retainer 160 may frictionally engage the outer surface 200 of the spring retainer 160, thus providing a damping mechanism slowing the movement of the spring retainer 160 through the retention chamber 190 due to the application of a impact force to the wheel 120 and/or a force applied from the spring 170.

The spring retainer 160 is biased away from the upper internal wall 195 of the spring retention chamber 190 by the spring 170. The spring retainer 160 is retained within the spring retention chamber 190 because as the spring retainer 160 is pushed out from the spring retention chamber 190 it comes to a point where the axle 150 which passes through the axle aperture 165 defined in the spring retainer 160 comes into contact with the sidewall 145 of the diagonal aperture 140 at the lower forward end 140' of the diagonal aperture 140, preventing further movement of the spring retainer 160 from within the spring retention chamber 190.

In other embodiments, a biasing and/or shock absorbing element other than or in addition to the spring 170 may be provided between the spring retainer 160 and upper internal wall 195 of the spring retention chamber 190. The biasing element may be any element which provides a force biasing the spring retainer 160 away from the upper internal wall 195 of the spring retention chamber 190. The biasing element may include, for example, one or more of a pneumatic piston, a balloon or bladder, a fluid or gas filled shock absorber, a pair of magnets having like poles facing one another with one of the magnets disposed on an upper portion of the spring retainer 160 and the other on the upper internal wall 195 of the spring retention chamber 190, an electromagnetic coil or solenoid, a resilient rubber or foam material, or any other form of biasing and/or shock absorbing element or system known in the art.

In use, if an impact force is applied to the wheel 120 in a rearward direction (a direction opposite that of arrow F) and/or an upwards vertical direction, the axle 150 pushes on the spring retainer 160, displacing the spring retainer 160 against the biasing force of the spring 170 upwards through the spring retention chamber 190. The axle 150 may travel in a rearward and upward direction through a portion of the diagonal aperture 140. Upon application of a sufficiently high impact force to the wheel 120, the axle 150 may travel in a rearward and upward direction through the diagonal aperture 140 until the axle comes into contact with the rearward upper portion 140" of the sidewall 145. The spring 170 absorbs the energy of the impact force dampening the force so that a sharp impact is not transferred into the frame member 110 of the stroller and to a child who may be present in the stroller.

In an alternate embodiment of a suspension block, a first spring 170 or other biasing and/or shock absorbing element may be disposed against an upper side of the spring retainer 160 as illustrated in FIGS. 2 and 3, and a second spring 170 or other biasing and/or shock absorbing element may be disposed against a lower side of the spring retainer 160. The spring retainer 160 may be disposed within the spring retention chamber 190, which may be modified from the spring retention chamber 190 illustrated in FIGS. 2 and 3 to include a closed lower end defining a lower internal wall. The second spring 170 or other biasing and/or shock absorbing element may be disposed between the lower side of the spring retainer 160 and the lower internal wall of the spring retention chamber. Such a suspension block could absorb and/or dampen impact forces applied to a wheel having an axis supported by the spring retainer 160 in both a forward and a rearward direction and in both an upward and a downward direction.

The suspension system may be disassembled and reassembled by a user or by a service technician to, for example, replace one or more components if desired. The axle 150 may be slid through the axle aperture 165 until it disengages from the spring retainer 160. The spring retainer 160 and/or spring 170 may then be removed from the spring retention chamber 190. The spring retainer 160 and/or spring 170 may be replaced and/or inserted back into the spring retention chamber 190. Insertion of the axle 150 through the diagonal aperture 140 and through the axle aperture 165 will secure the spring retainer 160 and spring 170 within the spring retention chamber 190.

Having thus described several aspects of at least one embodiment, it is to be appreciated various alterations, modifications, and improvements will readily occur to those skilled in the art. Such alterations, modifications, and improvements are intended to be part of this disclosure, and are intended to be within the spirit and scope of the disclosure. Accordingly, the foregoing description and drawings are by way of example only.

What is claimed is:

1. A stroller comprising:
a frame member;
a suspension block coupled to the frame member and including:
a body;
a suspension mechanism coupled to the body and disposed at an acute angle from a vertical axis of the body, wherein the suspension mechanism includes a spring retainer supported by the suspension mechanism, and the spring retainer is at least partially disposed within a spring retention chamber defined in the body of the suspension block; and
a wheel mounted on an axle, the axle supported by the suspension block, the axle passing through an axle aperture defined in the spring retainer.

2. The stroller of claim 1, wherein the suspension mechanism includes an aperture defined by sidewalls extending from sides of the suspension block, the axle passing through the aperture.

3. The stroller of claim 2, wherein the aperture is disposed at an angle of about 30° from the vertical axis of the body when the axle is in a home position.

4. The stroller of claim 1, wherein the spring retainer is biased away from an upper wall of the spring retention chamber.

5. The stroller of claim 4, wherein the spring retainer is biased away from the upper wall of the spring retention chamber by spring having a lower end coupled to the spring retainer and an upper end disposed against the upper wall of the spring retention chamber.

6. The stroller of claim 5, wherein at least a portion of the spring retainer is retained within the spring retention chamber by the axle.

7. The stroller of claim 1, wherein the suspension mechanism is configured and capable of absorbing an impact force applied to the wheel in a horizontal direction, an impact force applied to the wheel in a vertical direction, or an impact force applied to the wheel with components in both the horizontal direction and the vertical direction.

8. The suspension block of claim 1, further comprising an aperture passing through the body and disposed at a non-zero acute angle from a vertical axis of the body.

9. The suspension block of claim 8, wherein the aperture foes an opening along an elongate axis of the spring retention chamber.

10. The suspension block of claim 9, wherein the aperture is defined by sidewalls extending from sides of the suspension block.

11. The suspension block of claim 9, further comprising a spring disposed between the spring retainer and an upper wall of the spring retention chamber.

12. The suspension block of claim 11, wherein an end of the spring fits around an upper reduced diameter portion of the spring retainer and rests against an upper shoulder portion of the spring retainer.

13. The suspension block of claim 11, wherein the spring exerts a force on the spring retainer biasing the spring retainer out of the spring retention chamber.

14. The suspension block of claim 13, wherein the spring retainer contacts a portion of an internal wall of the spring retention chamber.

15. A suspension block for a stroller, the suspension block including:
   a body;
   a spring retention chamber defined in the body and having an axis disposed at an acute angle relative to a vertical axis of the body;
   a spring retainer at least partially disposed within a spring retention chamber; and
   an axle of a wheel of the stroller passing through an axle aperture defined in the spring retainer.

\* \* \* \* \*

UNITED STATES PATENT AND TRADEMARK OFFICE
CERTIFICATE OF CORRECTION

| | | |
|---|---|---|
| PATENT NO. | : 8,967,647 B1 | Page 1 of 1 |
| APPLICATION NO. | : 14/024768 | |
| DATED | : March 3, 2015 | |
| INVENTOR(S) | : Richard M. Bastien | |

It is certified that error appears in the above-identified patent and that said Letters Patent is hereby corrected as shown below:

In the Claims:

Column 7, claim 9, line 22, delete "foes" and insert --forms--.

Signed and Sealed this
Second Day of June, 2015

Michelle K. Lee
*Director of the United States Patent and Trademark Office*